US008239280B1

(12) United States Patent
Feinberg et al.

(10) Patent No.: US 8,239,280 B1
(45) Date of Patent: Aug. 7, 2012

(54) METHOD, MEDIUM, AND SYSTEM FOR ADJUSTING PURCHASING POWER VALUES

(76) Inventors: Igor Feinberg, Needham, MA (US); Michael Brodsky, Brookline, MA (US)

(*) Notice: Subject to any disclaimer, the term of this patent is extended or adjusted under 35 U.S.C. 154(b) by 183 days.

(21) Appl. No.: 12/886,345

(22) Filed: Sep. 20, 2010

Related U.S. Application Data

(60) Provisional application No. 61/244,333, filed on Sep. 21, 2009.

(51) Int. Cl.
*G06Q 30/00* (2012.01)
(52) U.S. Cl. .................. 705/26.35; 705/35
(58) Field of Classification Search ............ 705/26.1, 705/26.35, 26.61, 35, 39
See application file for complete search history.

(56) References Cited

U.S. PATENT DOCUMENTS

| | | | |
|---|---|---|---|
| 6,574,608 B1 | 6/2003 | Dahod et al. | |
| 6,882,977 B1 | 4/2005 | Miller | |
| 7,065,494 B1 | 6/2006 | Evans | |
| 7,080,030 B2 | 7/2006 | Eglen et al. | |
| 7,139,725 B1 | 11/2006 | Moyerson | |
| 7,461,022 B1* | 12/2008 | Churchill et al. ............. | 705/37 |
| 2001/0032123 A1 | 10/2001 | Burns et al. | |
| 2003/0120591 A1* | 6/2003 | Birkhead et al. ............. | 705/39 |
| 2004/0015414 A1 | 1/2004 | Sidlo et al. | |
| 2005/0125363 A1* | 6/2005 | Wilson et al. ............. | 705/75 |
| 2006/0059055 A1 | 3/2006 | Lin | |
| 2007/0078758 A1 | 4/2007 | Susskind et al. | |
| 2007/0083459 A1* | 4/2007 | Eubanks ............. | 705/38 |
| 2010/0106620 A1* | 4/2010 | Marcus ............. | 705/27 |

OTHER PUBLICATIONS

Faith Glasgow, "Personal Finance and Investing All-in-One for Dummies" John Wiley & Sons, Jul. 20, 2007.*
Malitz "Radiohead's 'Rainbows': Is Free Release a Potential Pot of Gold?" washingtonpost.com, Oct. 11, 2007, 2 pages.

* cited by examiner

*Primary Examiner* — Matthew Zimmerman
(74) *Attorney, Agent, or Firm* — Sheridan Ross PC

(57) ABSTRACT

Described are embodiments for valuing products or services. In one embodiment, a buyer is enabled to anonymously access content from a website, choose one of several payment options that most closely reflect the buyer's perceived value of the content and to pay for the product while still maintaining anonymity. The buyer is required to make a payment, even if it is zero, to maintain his/her purchase power and ability to continue buying from a particular seller as well as to use this facility. The embodiment maintains statistical data on all purchases and an amount paid by each of the buyers and offers an ability to provide and display numerical and textual feedback to the sellers regarding the quality and relevance of the accessed content.

20 Claims, 9 Drawing Sheets

Statement for July 21, 2009 to August 21, 2009

Due Date: September 05, 2009    Pay what feels right  (Pay)   $0.00

Content Seller

Purchase Power $42.00    Total Cost = $220.00    Total Paid = $100.00    Pay Now  $0.00

| Trans Number | Trans Date | Product Desc | Sugg Retail | % Contribution | | | | | Contribution | Charity | Trans Type | Rate This Product |
|---|---|---|---|---|---|---|---|---|---|---|---|---|
| | | | | 0% | 25% | 50% | 75% | 100% | | | | |
| 100342 | 8/1/2009 6:42:42 PM | Add Comments to C# | 40.00 | ⊙ | ○ | ○ | ○ | ○ | 0.00 | ☐ | Downloaded | *Rate It!* |
| 100345 | 8/1/2009 6:47:20 PM | Simple DB Interface | 40.00 | ○ | ○ | ⊙ | ○ | ○ | 20.00 | ☐ | Downloaded | *Rate It!* |

*Products Management*

Company Name

Enter your Initial Purchase Power and select your choice for charity contributions.

804 — { Initial Purchase Power [60.00]     Charity Selection [Unicef ▼] } — 802

806 — { [Add New Products]     Save Changes

| | | ProductID | ProviderID | ProdName | Category | WeightFactor | CharityOption | SuggRetail | TotalSold | TotalReceived | Feedback |
|---|---|---|---|---|---|---|---|---|---|---|---|
| Edit | Delete | 10223 | 10301 | Simple DB Interface | Developers | 50 | N | 100.0000 | 12 | 14 | Get Ratings |
| Edit | Delete | 10228 | 10301 | Phone Operations | Tech Bulletin | 75 | N | 50.0000 | 4 | 43 | Get Ratings |
| Edit | Delete | 10229 | 10301 | Cable Insertion | Tech Bulletin | 20 | N | 30.0000 | 5 | 12 | Get Ratings |

FIG. 8

METHOD, MEDIUM, AND SYSTEM FOR ADJUSTING PURCHASING POWER VALUES

BACKGROUND

E-commerce has grown exponentially during the last decade. The majority of sales revenue, however, was generated by the sales of tangible goods and services due, among other factors, to improved public confidence in transaction security.

Sales of products available for purchase online (i.e., through the Internet) continue to lag behind this trend primarily because of a prospective purchaser's perceived risk of receiving material of dubious value or relevancy, their inability to evaluate relevance and/or quality of a product prior to making the decision to actually purchase the product or material, the practical limitations on their ability to effectively return unsatisfactory products or obtain a refund for such products, the risks associated with providing personal and financial information to an unknown seller, and their perception that a suitable free-of-charge product is or may be available on another website.

Attempts have been made by various sellers to overcome these impediments by offering products with a deferred payment option or simply offering products free of charge in an attempt to receive some indirect compensation.

Other contributing factors that tend to force e-sellers to give away their products are an inability to adequately advertise themselves as a brand, an inability to form and sustain long-term relationships with their potential customers, the difficulties with portraying a product's value and relevance to their prospective customers, and the absence of a system that encourages payment for a valuable product or service.

In an effort to get at least some monetary compensation for their products or services some providers of software, music, art, professional services, scientific and research papers, expert help, business consulting, image processing and others seek voluntary payments from consumers. Often these providers depend upon Tips and Donation payment schemes. However, because such schemes request a voluntary payment prior to delivery of the content or service when the value of the content is still uncertain, few, if any, such content providers have effectively captured commensurate value on a consistent basis. These content providers must contend with the facts that their potential customers have no way to evaluate the usefulness and relevance of their product before paying for it, that often there is no on-going relationship between a seller and a buyer, thus it is not safe to pay in advance of delivery of the product or service, and that even if a customer is satisfied with the product or service there is little assurance that a buyer will make a donation at a date much after the product is received and used unless they are reminded of their implied obligation to do so.

Embodiments of the present invention have been made in light of these and other considerations. However, the relatively specific problems discussed above do not limit the applicability of the embodiments of the present invention.

SUMMARY

The summary is provided to introduce aspects of some embodiments of the present invention in a simplified form, and is not intended to identify key or essential elements of the claimed invention, nor is it intended to limit the scope of the claims.

Embodiments of the present invention enable sellers of items (e.g., content providers, sellers of product, or sellers of services) to select from a configurable set of sales rules for each item they offer, including among other parameters the suggested price, the initial credit extended to individual buyers, referred to as the Initial Purchase Power Value, and a Weight Coefficient—a parameter that determines the affect that each purchase transaction makes on a buyer's Initial Purchase Power Value. Content buyers, when requesting to access a product from the seller's website, are automatically redirected to create an account while providing only an e-mail address. Embodiments protect the buyer's identity from the seller, allow accessing of content, calculate the buyer's remaining purchase power and later send a notification which includes a link to the buyer's account with a request to pay for the accessed items.

The buyer accesses an account where a periodic statement containing a list of accessed items is displayed. The buyer is required to select one of several discrete payment options, including a payment of zero that most closely reflects his or her satisfaction level with the product and their perceived value of the product for each accessed item. A buyer then uses a payment processing service of their choice, in order to maintain anonymity of the purchase, to make payment. The buyer is provided with a mechanism and is encouraged to provide textual and numerical feedback on the accessed item's quality or usefulness to the seller while still maintaining anonymity. The buyer accesses his account where a periodic statement requesting payment and containing a list of accessed items is displayed. The buyer is also provided with a mechanism and is encouraged to provide textual and numerical feedback on an accessed item's quality or usefulness to the seller while still maintaining anonymity. Embodiments may be implemented as a computer process, a computing system or as an article of manufacture such as a computer storage medium.

BRIEF DESCRIPTION OF THE DRAWINGS

Non-limiting and non-exhaustive embodiments are described with reference to the following figures.

FIG. 5 illustrates a statement requesting payment from a user for accessed content, according to an embodiment.

FIG. 8 illustrates a form for receiving sales rules from a content provider, according to an embodiment.

DETAILED DESCRIPTION

The principles of the present invention may be further understood by reference to the following detailed description and the embodiments depicted in the accompanying drawings.

Figure 1:
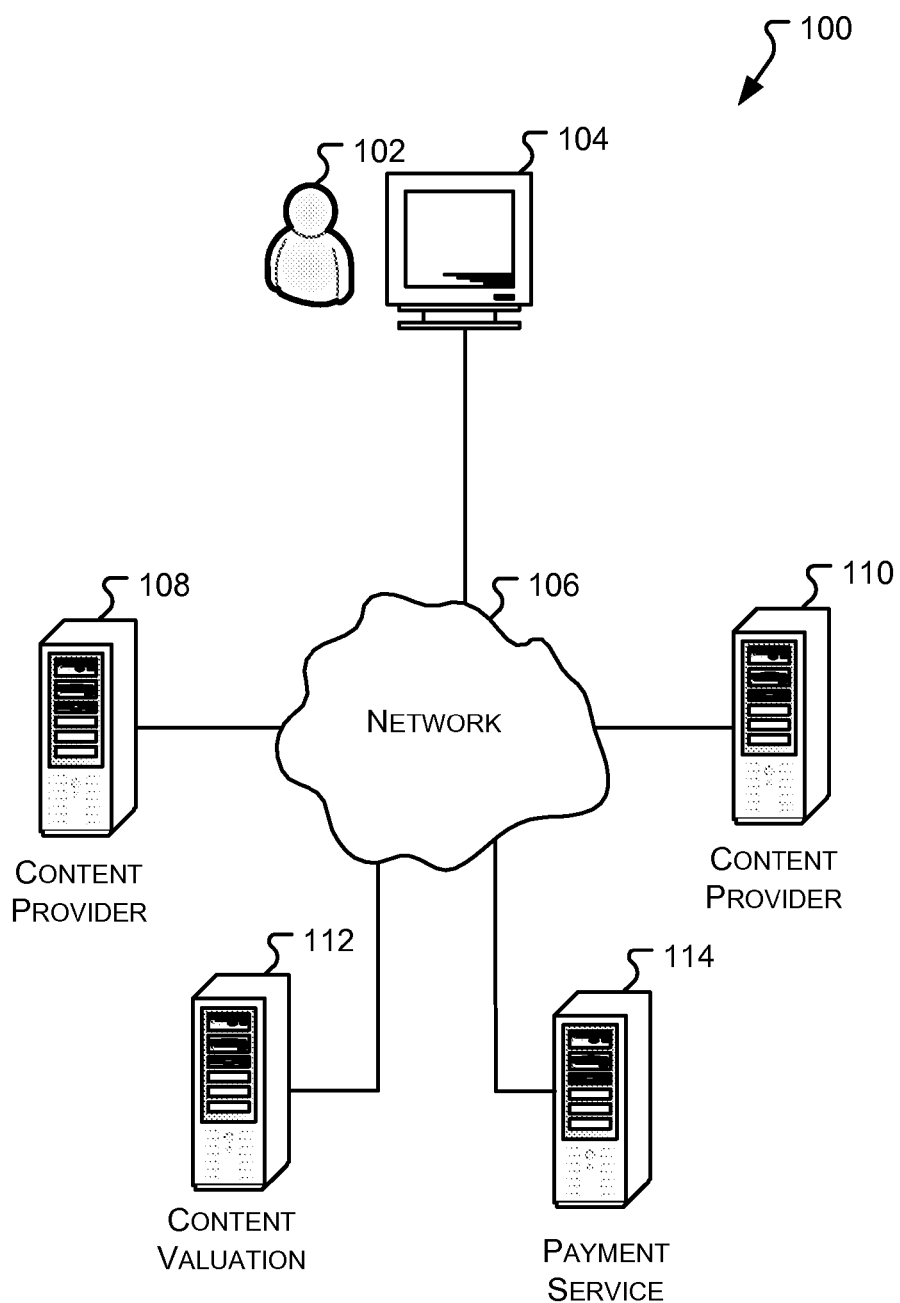
FIG. 1 illustrates a system according to an embodiment.

FIG. 1 is a simplified depiction of an environment including system 100 according to one embodiment. FIG. 1 shows relationships and communications between some elements of system 100. FIG. 1 shows a user 102 that utilizes a computing device 104 (e.g., a client computing device) for accessing a network 106 (e.g., the Internet). Computing device 104 may have a browser that user 102 uses to search network 106. Content providers 108 and 110 are also connected to network 106 and are illustrated as computing devices (e.g., server computing devices) that provide access to content that user 102 may access and in some embodiments download to computing device 104. Content providers 108 and 110 may include databases for storing content and websites through which user 102 can access content from the providers 108 and 110. As those with skill in the art will appreciate, content providers 108 and 110 may provide different types of content examples including but not limited to software applications, music, art, video content, games, periodicals, books, and scientific/research papers. As those with skill in the art will also appreciate, content providers 108 and 110 may provide access to content in any suitable way. For example, content providers 108 and 110 may provide access to digital content by allowing the content to be read, viewed, downloaded, executed, streamed, otherwise stored, printed, displayed, etc. The present invention is not limited to any particular mechanism of accessing content.

Also shown in FIG. 1 is content valuation system 112 shown as a computing device (e.g., a server computing device). As described in greater detail below, content valuation system 112 provides an infrastructure for valuing content accessed from content providers such as content providers 108 and 110. In embodiments, content providers 108 and 110 register and establish an account with content valuation system 112 to provide their content to users, such as user 102, under a set of restrictions generally referred to as sales rules. As described in greater detail below, the sales rules indicate parameters and conditions for allowing a user to access content from a content provider.

User 102 also registers and establishes an account with content valuation system 112 to obtain access to content provided by content providers 108 and 110. By utilizing content valuation system 112 to obtain content, user 102 is assigned a numeric access value (also referred to in some embodiments as Purchase Power Value or PPV) that allows a user to access on-line content provided by content providers 108 and 110. Each individual content provider 108 and 110 can indicate, as part of their sales rules, what amount of PPV is provided to a user.

By assigning a PPV to the user, content valuation system 112 and registered content providers 108 and 110 allow users to access content within the limit of this PPV provided to the user. After a predetermined evaluation period (set by the content providers when registering with content valuation system 112), content valuation system 112 sends or displays a statement to users to provide them an opportunity to pay for the content and provide evaluation information about the used content. Additional details about the functionality and operation of embodiments of content valuation system 112 are described below.

A payment processing system 114 is also shown in FIG. 1. The payment processing system 114 provides a service for processing payments from users for content accessed from content provider system 108. The payment processing system 114 is used, in some embodiments, for facilitating the payment to a content provider for content that the user previously accessed digitally, including but not limited to audio and video streaming and web-based applications. Examples of payment processing systems include, but are not limited to, credit card processing systems and the systems/services known as PayPal, Google Checkout, Wirecard, Moneybookers, 2Checkout, CCNow or Kagi. As those with skill in the art will appreciate, any payment process or payment system can be utilized.

Figure 2:
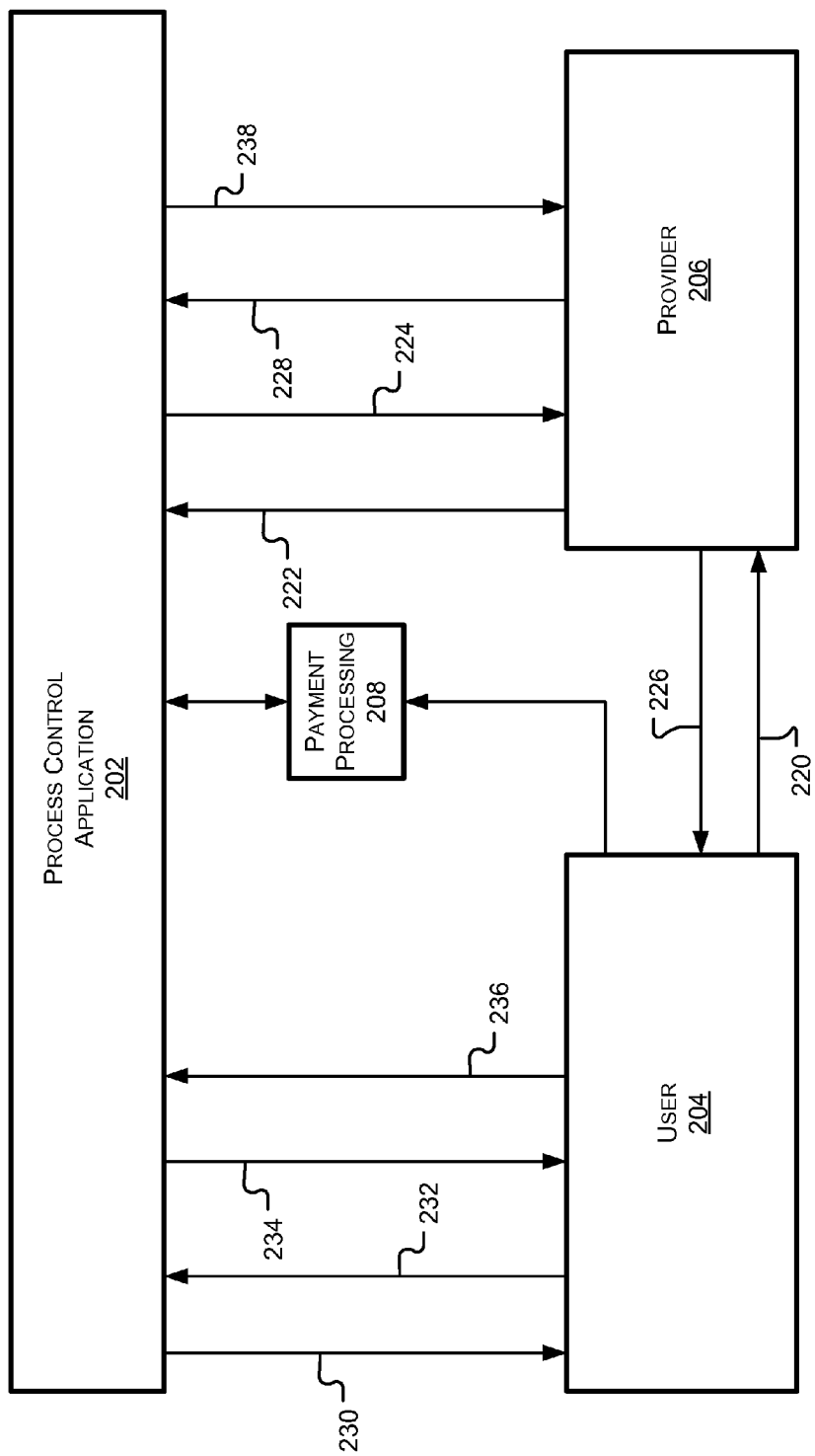
FIG. 2 illustrates an environment for implementing a content valuation system according to an embodiment.

FIG. 2 is a simplified depiction of a basic environment in accordance with one embodiment. FIG. 2 is merely one embodiment that shows the overall relationships and communications between elements. The following description is not intended to be limiting but merely to describe a basic embodiment.

As shown in FIG. 2, the embodiment includes a process control application 202 for a valuation system that resides on a computer or server that is logically connected to a network readily accessible by a user 204, a provider 206, and a payment processing system 208 which may be external to and independent from user 204 and provider 206. Also indicated are several connections connecting two or more of application 202, user 204, and provider 206. The valuation system and application 202 is consistent with one embodiment of the present invention.

User 204 in embodiments is a consumer of products or services and may, or may not, have had prior contact with provider 206. In some embodiments, user 204 utilizes a client computer with a browser. At some point user 204 encounters provider 206 and learns enough about a product or service provided by provider 206. For example, in embodiments provider 206 may include a website that provides information about products or services and also allows users such as user 204 to request products or services. User 204 initiates a request 220 for a product or service from provider 206.

When provider 206 receives request 220 the provider 206 determines whether the requested product or service is being offered using a valuation system consistent with embodiments of the present invention. If so, then the request 220 is redirected 222 to application 202.

Application 202 then determines whether the user has previously registered with the valuation system. In this example, the user has previously registered. Application 202 determines if the user has enough credit, in some embodiments referred to as Purchase Power Value (PPV), with the provider 206 to access the requested product or service. In this example, the user 204 has not previously accessed any item from provider 206.

As described in greater detail below, users sign up for PPV the valuation system. Each provider controls the PPV that a first time user can receive for products or services provided by a provider. When registering with the valuation system, the providers, e.g., provider 206, sets rules regarding access to its products or services including an Initial Purchase Power Value (IPPV) assigned to first time users. The IPPV is typically set to an amount greater than the suggested price assigned to product or services that are being offered through the valuation system. Provider 206 could have a number of products or services, or multiple versions of a product or service. In one embodiment, the provider could set the IPPV of a user at a level that permits a first time user to only access introductory products or services. This may incentivize a user to provide feedback and/or make a payment (described in greater detail below) for the introductory products so that they can increase their PPV and be allowed to download products or services with more features.

Application 202 determines that the user, being a first time user, has an initial IPPV that allows it to access the requested product or service. At this point, the application 202 sends a reply 224 to the provider 206 indicating that the access may be granted.

When the provider 206 receives the reply 224, it allows user 204 to access 226 the product or service. When access 226 is provided to the user 204, the provider will send a message 228 to the application 202 indicating that download is complete. Application 202 will then adjust the PPV according to the rules defined by provider 206 for this particular product or service. The user 204 in embodiments has some period of time, for example thirty days, to install, use, or in some manner take advantage of the product or service that was accessed.

At some point in time, a customer statement will be generated by the application 202 of the valuation system. The statement includes at least a line item associated with the product or service accessed and used. After this customer statement has been generated the application 202 generates a communication, such as an email 230 to the user. In embodiment, the email may include a link that when selected generates a request 232 to retrieve the customer statement. The customer statement includes a list of products or services that the user has accessed that have been provided by provider 206 or other providers through the valuation system. In response to the request 232, application 202 will send a reply 234 that provides access to the statement.

As part of the statement showing the various products or services which the user 204 has accessed, the user 204 has an opportunity to provide their personal opinion with respect to the quality, usefulness, or any other features of the product or service. The user may also choose to offer comments related to the product or service. The user 204 is also offered the opportunity to compensate the provider 206.

For example, the user 204 may enter a monetary value in the statement and select a link to submit a response 236 with the amount the user 204 agrees to pay. The user 204 may also provide some form of text based feedback within response 236, including one or more attachments, for example to illustrate some benefit derived from the use of the product or service. The feedback would remain anonymous unless the user 204 chose to include identifying information.

When the user 204 has completed reviewing the statement, indicated a monetary amount, and has entered any comments or feedback information in response 236, application 202 will proceed to process payment of the monetary amount indicated by user 204. In embodiments, the user may have an option to include a transaction identifier of their choosing, for example a purchase order number or other useful identifier in response 236.

In some embodiments, a user 204 may provide application 202 with payment information in request 236. For example, the user 204 may provide credit or debit card information to application 202. Application 202 can then communicate with payment processing 208 to process the payment information and receive the monetary compensation. In some embodiments, the user can choose a payment method of their choice from among anonymous options, for example an intermediary payment processor such as Pay-Pal™. In these cases, payment processing 208 includes accessing these intermediary payment processors.

In other embodiments, the application 202 creates an appropriate invoice and provides a printable electronic statement/invoice to the user 204. The invoice may include all information required for user 204 to submit payment via payment processing 208 or other systems.

In embodiments, application 202 checks, on a periodic basis, for confirmation of payment for invoices (payment requests). As each invoice clears (payment has been confirmed), the user's 204 account is updated to reflect the transaction as complete and triggers several additional processes within the valuation system's application 202.

One process is to apply the rules established by provider 206 for allowing access to its product or service, namely a user's PPV. For example, if the user 202 chose to pay zero for the product or service accessed, then no payment would have been processed. Provider 206 may have established rules that maintain a user's PPV even if the user paid nothing for the product, as long as some feedback was provided. In some examples, provider 206 may establish rules that if neither payment nor feedback was offered by user 204, the PPV will be reduced by some calculated amount. Likewise, depending upon the rules established by provider 206, if user 204 paid some amount and some feedback was provided, user's 204 PPV could be increased. Overall it could be expected that products of more quality, usefulness, or at least of more likely perceived value would be downloaded more often providing an indicator to the provider 206 of the demand for the various product or service offerings.

On a periodic basis or on an ad hoc basis, for example once per month, application 202 of the valuation system generates and sends a consolidated statement 238 to provider 206. The statement 238 includes, in embodiments, tabulations regarding each product or service offered by provider 206 including the number of successful accesses to products or services, the number of payments for products or services, the number of users that included feedback for each product or service, the total revenue generated, etc. These statements 238 are useful for provider 206 to get an understanding of the demand for each of its products or services. In response, provider 206 can modify the offerings of products and services, or can change rules to allow lesser or greater access to certain products or services, such as by requiring payment for products that are in higher demand.

In some embodiments, application 202 may store and aggregate data across data providers. The aggregated data can provide valuable information about a specific product or service that is provided by a number of providers. The data can be used to extract trends about users' valuation of specific types of products or services, and also whether the type of provider makes a difference to a users' valuation of the same product or service. These are just some examples of information that may be obtained by aggregating data across data providers. Those of skill in the art will appreciate that additional information can be obtained from the aggregated data. The information, or the raw data, can be made available as a service to providers, search engines, or other entities that can utilize the information.

Although some of the description herein, focuses on the access of content such as may be provided by content providers 108 and 110, those with skill in the art will appreciate that embodiments of the present invention are useful in providing and valuing other items besides digital content. For example, embodiments may be useful for providing and valuing services such as professional services, business consulting, expert help, and image processing, or for providing and valuing goods, e.g., as described above with respect to FIG. 2.

Figure 3:
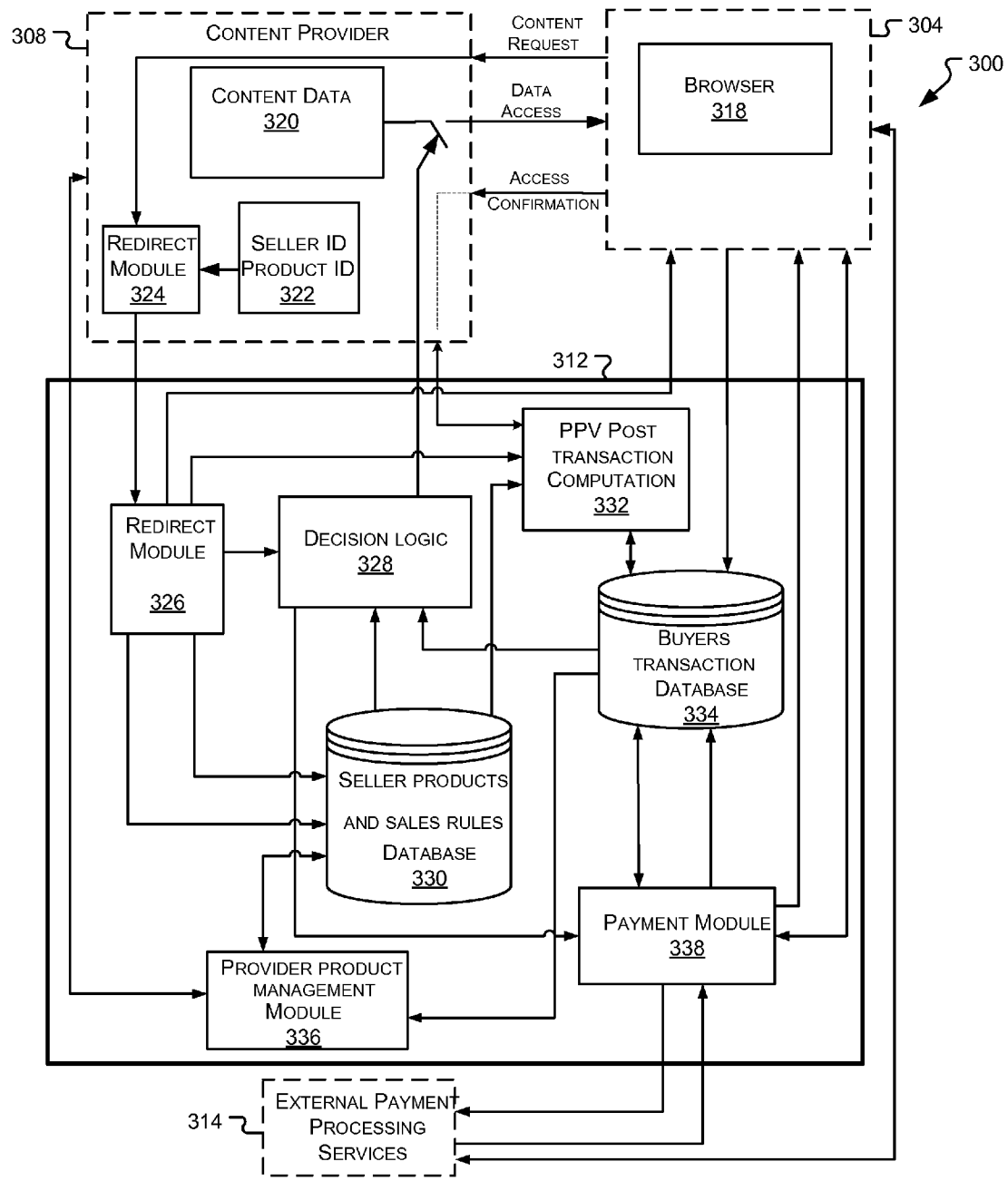
FIG. 3 illustrates an environment for implementing a content valuation system according to a second embodiment.

FIG. 3 shows a software environment illustrating, in more detail, features of an embodiment of the present invention. FIG. 3 shows a client 304. Client 304 includes a browser 318 that a user of client 304 utilizes to search and access information available on a network such as the Internet. FIG. 3 also shows a content provider 308 which is connected to the network and provides content data. A content valuation system 312 is also shown.

Content provider 308 may be implemented in embodiments on a server computer system that is connected to a network that allows communication with client 304 and content valuation system 312. As shown in the embodiment of FIG. 3, content provider 308 includes content data 320. Content data 320 may be any type of content data that users may desire to access, including, but not limited to, text, audio, video, or combinations thereof. Also, content provider 308 includes ID information 322 which identifies a particular seller and product (seller ID/product ID). Content provider 308 also includes redirect module 324, which redirects download requests sent to content provider 308 to content valuation system 312. As shown in FIG. 3, when content provider receives a request from a browser such as browser 318, redirect module 324 redirects the request to content valuation system 312. In embodiments, the redirected request may include ID information 322.

Although shown in FIG. 3 as stored at content provider 308, in embodiments, the content data 320 and ID information 322 may be stored remotely from content provider 308. For example, the content data 320 and ID information 322 may be located in remote data stores that are accessible to content provider 308 through a network. When content provider 308 requires access to content data 320 or ID information 322 it may access the remote data stores and retrieves the necessary information.

As shown in the embodiment of FIG. 3, content valuation system 312 includes redirect module 326, decision logic 328, a database 330 storing sales rules and seller information, a module 332 for calculating user purchase power, database 334 storing buyer transaction information, a provider product management module 336 and a payment module 338. It should be understood that the illustration of content valuation system 312 shown in FIG. 3 is merely one example of a content valuation system and in other embodiments may include additional components, or less than the components shown in FIG. 3. In embodiments, the databases 330 and 334 may be stored remotely from content valuation system 312. For example, the databases may be stored remotely on servers that are accessible to content valuation system 312 through a network. When system 312 requires access to seller information or buyer transaction information it may access the databases 330 and 334 through a network and retrieve the necessary information.

The content valuation system 312 provides a framework for content provider 308 to provide content to users and realize value from providing the content as well as feedback as to the usefulness of the content. Content provider 308 initially registers with content valuation system 312. As shown in the embodiment in FIG. 3, provider product management module 336 manages the registration of content provider 308. As part of the registration process content provider 308 will create an account on content valuation system 312 that includes a provider ID and identification of content (e.g., product ID) that the provider 308 is making available to users. Also as part of the registration process, content provider 308 will also establish sales rules for providing content to users. Sales rules are described in greater detail below. The account is stored in database 330 of content valuation system 312. After registration, content valuation system 312 manages the access of content data 320 from content provider 308.

A user, such as a user utilizing browser 318 on client 304, also registers with content valuation system 312 by entering registration information. In embodiments, one feature of content valuation system 312 is the relatively minor amount of information necessary for a user to register with system 312. In these embodiments, a user may maintain relative anonymity and still have an opportunity to access content from a content provider such as content provider 308. For example, in one embodiment, a user may only be required to enter an electronic mail (e-mail) address and select a password. However in other embodiments, a user may be required to enter more information in order to register with content valuation system 312. After a user has entered registration information, an account is created and stored in a database 334 of content valuation system 312.

As part of the process of acquiring content for a user, such as a user utilizing client 304, system 312 will access sales rules stored in database 330 for content provider 308. In embodiments, the sales rules will indicate an initial Purchase Power Value (IPPV) to assign to the newly registered user. The Purchase Power Value (PPV) is not limited to any specific process or system. It merely provides a value that indicates an amount of content that a user may access through the Internet from a specific content provider, such as content provider 308.

In one embodiment, the PPVs may be treated as credits that are consumed when content is accessed by a user. As those with skill in the art will appreciate, any system or process that controls the amount of content that users are allowed to access may be used in lieu of or in addition to a PPV.

In one embodiment, when content provider 308 is registered with system 312, and a user attempts to access content data from content provider 308, the user is redirected, with redirect module 324 at content provider 308, to redirect module 326 at system 312. The user is prompted by system 312 to enter registration information. The redirected request may be referred to in some embodiments as an access validation request because the content provider is requesting that the system 312 validate the request from the user to access content from provider 308.

Decision logic 328 determines whether the user has previously been registered. In those instances in which the user is not previously registered with system 312, a new account is created by system 312 before allowing the requested content to be accessed from content provider 08. In those instances in which a user has already registered with system 312, decision logic 328 of system 312 will access the user's account from database 334 and determine whether the user's current PPV allows for the user to access the requested content, such as whether the current PPV is greater than a predetermined threshold value necessary for accessing content. If the user's current PPV allows for the user to access the requested content, decision logic 328 of system 312 sends an access validation response to provider 308 approving the content access.

Access to content data 308 includes, in embodiments, downloading or streaming data to client 304. As those with skill in the art will appreciate, client 304 may include other applications including but not limited to plug-ins to browser 318 that allows a user on client 304 to view, listen, or otherwise utilize the content data 320 downloaded from content provider 308.

After a user has accessed content data 320 from content provider 308 and a predetermined evaluation time period has passed, system 312 provides a statement to the user. The statement provides a plurality of payment options for the user to pay for the previously accessed content. In some embodiments, the payment options include a suggested retail price for the accessed content and one or more options for payment of an amount less than the suggested retail price. In one embodiment, the payment options will include an option for not making any payment for the accessed content. System 312 includes a payment module 338 that manages the sending or displaying of the statement and payment by the user. Also shown in FIG. 3 is an external payment processing service 314. As noted above with respect to payment service 114 (FIG. 1) external payment processing service 314 may in embodiments include credit card processing systems/services or the systems/services known as PayPal, Google Checkout, Wirecard, Moneybookers, 2Checkout, CCNow or Kagi.

In embodiments, module 332 of system 312 may send a request to a user to provide evaluation information for the accessed content. For example, a form may be sent or displayed to provide selections for a user to provide their opinions on the characteristics of the accessed content, such as quality, usefulness, ease of use, etc. The request for evaluation information may be sent or displayed as part of the statement sent to the user for payment or separately from the statement.

In some embodiments, system 312 will also maintain statistics or other information that can be useful to a content provider. For example, in embodiments system 312 will store, in the database 334, information regarding the number of times particular content has been requested. System 312 may also store payment history for content. In other words how much users paid for the content.

In other embodiments, logic 328 of system 312 automatically adjusts different parameters. For example, using the statistics described above, logic 328 of system 312 automatically changes the suggested retail price of content depending on the history of users' payment for the content. That is, logic 328 of system 312 will reduce the suggested retail price of content if statistics show that no one has paid the suggested retail price, or in other embodiments that no one has paid even 75% of the suggested retail price. This is merely one example of automatic changes that logic 328 may make in some embodiments of the present invention.

FIGS. 1-3 are only examples of possible embodiments and are not intended to be limiting. Other embodiments may include combinations of features described individually with respect to FIGS. 1-3. For example, in some embodiments, the content valuation system and the content provider may be located at the same location or even on the same server.

Figure 4:
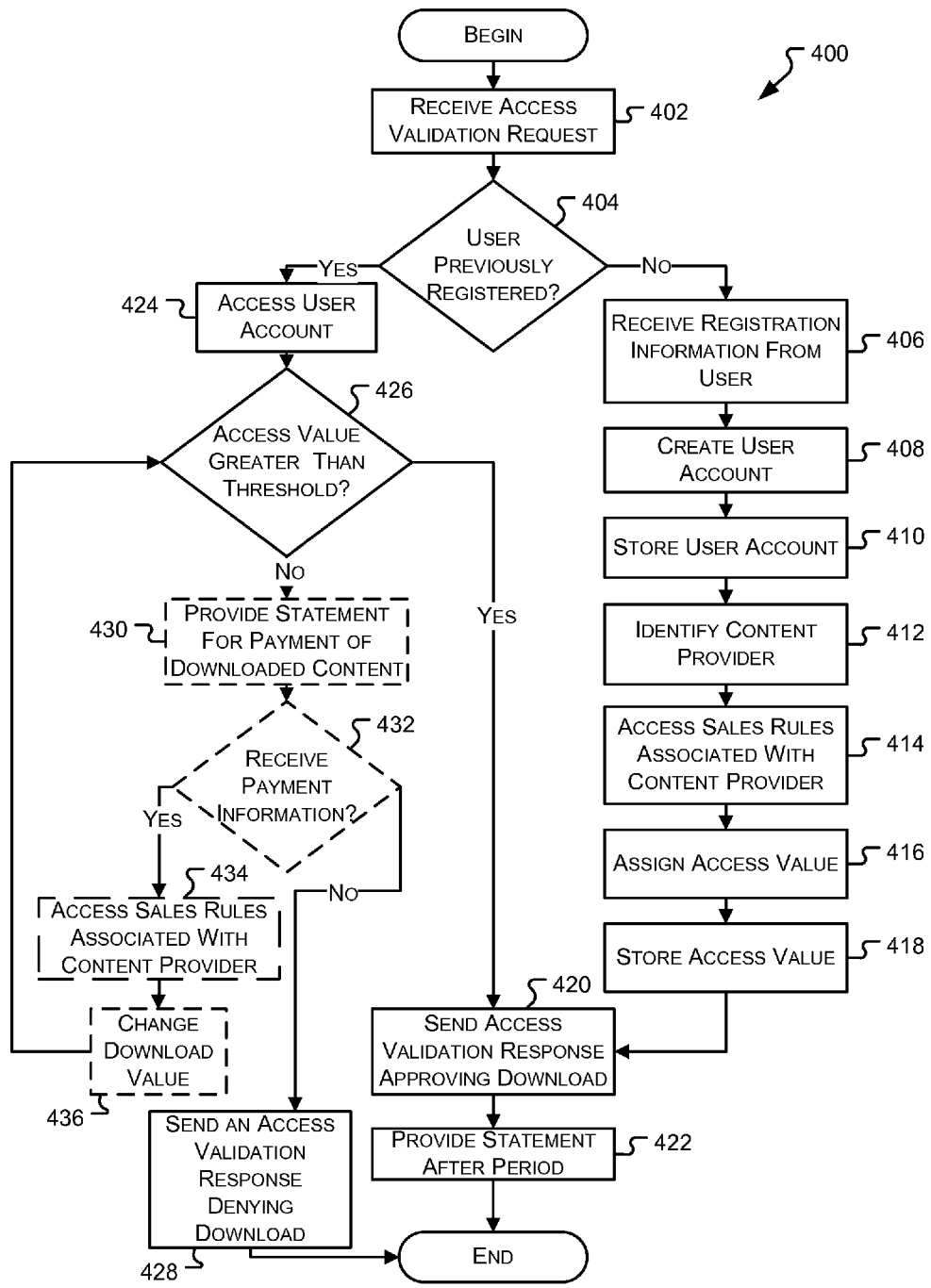
FIG. 4 illustrates a process of providing content and valuing content according to an embodiment.

FIGS. 4 and 5 illustrate operational flows 400 and 500 according to embodiments. Operational flows 400 and 500 may be performed in any suitable environment. For example, the operational flows may be executed in environments such as illustrated in FIGS. 1-3. Therefore, the description of operational flows 400 and 500 may refer to at least one of the components of FIGS. 1-3. However, any such reference to components of FIGS. 1-3 is for descriptive purposes only, and it is to be understood that the implementations of FIGS. 1-3 are non-limiting environments for operational flows 400 and 500.

Furthermore, although operational flows 400 and 500 are illustrated and described sequentially in a particular order, in other embodiments, the operations may be performed in different orders, multiple times, and/or in parallel. Further, one or more operations may be omitted or combined in some embodiments.

FIG. 3 illustrates an operational flow 400 according to an embodiment, for providing content to a user. In embodiments, flow 400 is performed by a content valuation system such as those described above 112 (FIG. 1) and 312 (FIG. 3). The content valuation system can be used to provide content from content providers to users. Flow 300 includes operation 302 where an access validation request is received. The access validation request may in some embodiments be received from a content provider such as content providers 108 and 110 (FIG. 1) or content provider 308 (FIG. 3). The access validation request may be a redirect of a request from a user to access content from a content provider. The request includes information about a user requesting to access content from a content provider. After operation 402, a determination is made at decision 404 as to whether the user has previously been registered. If at decision 404 a determination is made that the user has not previously been registered, flow passes to operation 406 where registration information is received from a user.

A feature of some embodiments is the relatively small amount of information that is required from a user to register at operation 406. In some embodiments, the user is only required to enter an electronic mail address and a password. These embodiments advantageously provide a user with relative anonymity. As those with skill in the art will appreciate, some users desire to maintain anonymity when accessing information from content providers (e.g., websites) that are not trusted.

After operation 406, flow passes to operation 408 where a user account is created using the registration information received at operation 406. At operation 410, the user account is stored in one or more computer storage media. From the request received at operation 402, operation 412 identifies the content provider from which the request to access content originated. This operation may be performed by simply evaluating the request for an identifier associated with the content provider.

After the content providers identified, flow 400 passes to operation 414 where Sales rules associated with the identified content provider are accessed. These sales rules are rules that have been previously established by the content provider for providing content for user. As those with skill the art will appreciate, operation 414 may involve accessing a database, or data store, that stores an account for the content provider and the sales rules associated with the content provider.

Sales rules are parameters and conditions established by a content provider for providing content to users. For example, sales rules may include a suggested retail price for content, a discount policy for allowing a user to pay less than the suggested retail price, an initial numeric value (also referred to in embodiments as Initial Purchasing Power), which is a numeric figure that reflects the initial purchasing credit that is extended to a user by the content provider to access content from the content provider.

The sales rules accessed at operation 414 are used to assign a Purchase Power value at operation 416. As noted above, the Purchase Power value is a numeric figure that reflects the amount of content that a content provider will initially allow a user to access. The Purchase Power value is not limited to any specific process or system. It merely provides a value that indicates an amount of content that a user may access from a specific content provider. The Purchase Power values are treated in embodiments as credits that are consumed when content is accessed by a user. As those with skill in the art will appreciate, any system or process that controls the amount of content that users are allowed to access may be used in lieu of or in addition to an access value. The Purchase Power value assigned to operation 316 is stored at operation 418 in association with the user account.

At operation 420, an access validation response approving access of the content is sent. In embodiments, the response will be sent to the content provider that originated the request received at operation 402.

After operation 420, a statement requesting payment for the accessed content is provided to the user at operation 422 after a predetermined evaluation period. The evaluation period provides the user an opportunity to evaluate and use the accessed content. The statement provided at operation 422 will in embodiments include a number of payment options for the user. In embodiments, operation 422 may include sending an e-mail to a user's e-mail address with the statement. The e-mail may include a link that a user can click to access the statement.

One example of a statement that may be sent at operation 422 is illustrated in FIG. 5. As shown in FIG. 5, the statement may include the product description 502 of accessed content. In the embodiment shown in FIG. 5, a user has accessed more than one content (i.e., first content and second content). The statement also shows a plurality of payment options 504 that the user may select to pay for the content. FIG. 5 is only one embodiment and other statement formats may be used as appropriate.

Figure 6:
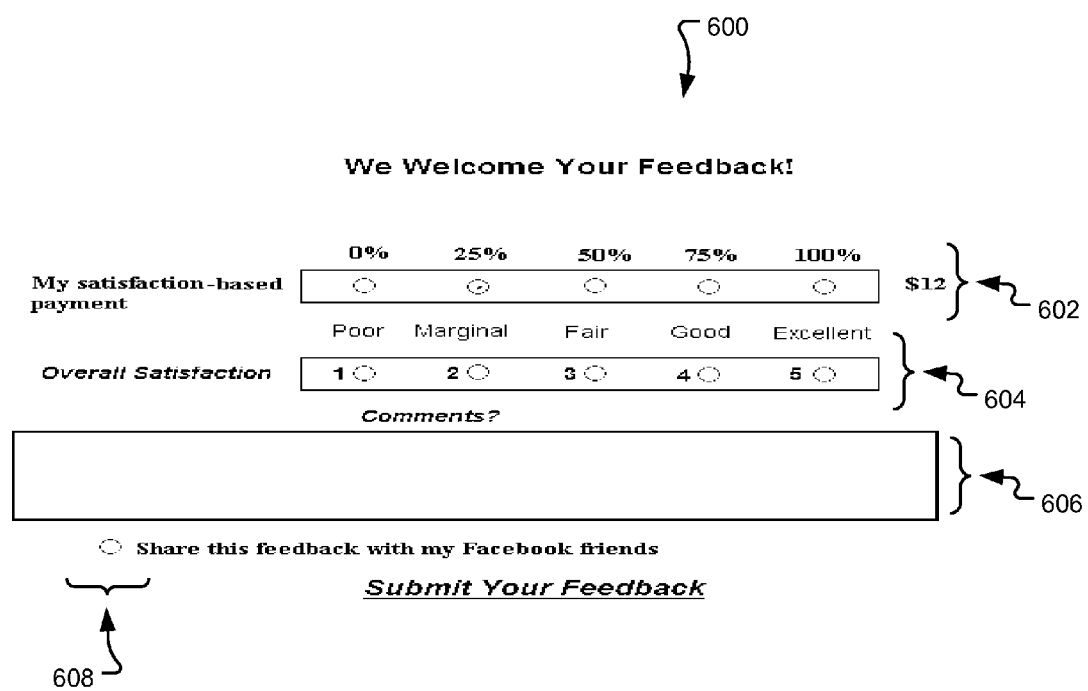
FIG. 6 illustrates a user information for accepting feedback from a user for accessed content, according to an embodiment.

Also shown in FIG. 5, is a user interface element 506 that when selected allows a user to provide feedback. In one embodiment, selection of element 506 will result in display of a feedback interface 600. As shown in FIG. 6, interface 600 provides a number of interface elements that facilitate receiving feedback from the user. Interface 600 includes elements 602 which allow a user to select a percentage of a suggested price for the content accessed. The user may select one of the elements 602 based on a level of satisfaction with the content. Interface 600 also includes elements 606 which allow a user to indicate an overall level of satisfaction. Field 606 allows a user to enter text to provide comments.

One feature that is available in some embodiments is the ability to share information regarding content feedback with other people. As shown in FIG. 6, element 608 allows a user to select to share the feedback information with members of the user's social network. As those with skill in the art will appreciate, the feedback or other information may be shared using a social networking site or other social networking application. In other embodiments, selection of element 608 may generate some type of communication for example, but not limited to, email, Short Messaging Service message (i.e., text message), Multimedia Messaging Service message, audio message, or other communication. The user can then select the people to receive the communication and share the feedback or other information in this way.

Referring back to FIG. 4, in embodiments, the statement provided at operation 422 is provided periodically, such as monthly or weekly depending on the preference of the content provider. The statement may therefore include information for payment on all content accessed by a user over a selected period of time. In any case, the period of time may coincide or be different from the evaluation period described above. In some embodiments, a user is required to respond to the statements in order to continue using the valuation service even if the purchaser chooses to pay 'zero' to the content provider.

if at decision 404 a determination is made that a user has previously registered, flow passes to operation 424 where the user account is accessed from for example one or more computer storage media. As part of accessing the user account at operation 424, a current Purchase Power value for the user provided by the content provider is accessed. After operation 424, flow passes to decision 426 where a determination is made whether the current purchase power value is greater than a predetermined threshold value.

If at decision 426 a decision is made that the current Purchase Power value, for the user with respect to the content provider, is greater than a predetermined threshold value then flow passes to operation 420 where as indicated above, an access validation response approving access of the content is sent. In embodiments, the response will be sent to the content provider that originated the request received at operation 402. After operation 420, a statement requesting payment for the accessed content is provided to the user at operation 422 after a predetermined evaluation period. As noted above, the evaluation period provides the user an opportunity to evaluate and use the accessed content.

If at decision 426, a decision is made that the current Purchase Power value is not greater than a threshold value; flow can pass to operation 428 where an access validation response with an indication of disapproval (i.e., denying the access of the content) is sent to the content provider. Flow 400 then ends.

Illustrated in dashed lines are additional operations 430-436 that may be part of some alternative embodiments of the present invention. In these embodiments, if at decision 426, determination is made that the Purchase Power value is not greater than a threshold value, flow will pass to operation 430 which provides a user with a statement for payment of previously accessed content. This option may be useful in situations where a user may have not yet received a first statement because the evaluation period has not expired for the previously accessed content. In this instance, a user may have exhausted the Purchase Power value provided to the user by the content provider. Thus, operation 420 gives the user an opportunity to make any decisions with respect to previously accessed content and perhaps receive additional Purchase Power value for accessing additional content.

Operation 430 is followed by a decision 432 where a determination is made as to whether the user has provided payment information. If at decision 432 a determination is made that the user has not provided payment information, flow passes to operation 428 where an access validation response denying the access is sent to the content provider.

However, if at decision 432 a determination is made that the user has provided payment information, flow passes to operation 434 where sales rules for the content provider accessed.

As noted above, content providers establish sales rules for determining the conditions under which a user may access content from the content provider. In some embodiments, the sales rules will indicate how a user's payment history for previous content accessed from the content provider will affect the access value. This feature protects the content provider from users who may constantly access content from the content provider and never provide any payment for any of the content. Under such a circumstance, a content provider may establish a sales rule indicating that if the user has selected to make no payment on any previous content accessed from the content provided, no additional access value will be provided to the user. Not receiving any payment for accessed content may indicate to a content provider that the user does not perceive the content of the content provider to have much value. Accordingly, the content provider may not want to continue to provide free content to a user that does not perceive the content as valuable.

In other embodiments, a content provider may simply establish a sales rule indicating that as long as the user has provided some indication of payment information even if a zero payment is made, then additional Purchase Power value may be provided to the user. These are merely some examples of sales rules that a content provider may establish in order to tie together the payment behavior of a user with additional access value which allows a user to access additional content. Those with skill in the art will appreciate that in other embodiments, other appropriate sales rules that accomplish the goals of the content provider may be established.

After operation 434, flow passes to operation 436, where the Purchase Power value provided to the user is changed in accordance with the sales rules accessed at operation 434. Flow then passes back to decision 426, where a determination is made as to whether the current Purchase Power value after the change in Purchase Power value made at operation 436 exceeds the predetermined threshold value. In some embodiments, even after a user provides some payment for previously accessed content, the Purchase Power value may not be enough to allow the user to access additional content. In other embodiments, a content provider may establish sales rules that require a user to have a higher Purchase Power value for some content than for other content. In such a case, the request received at operation 400 to maybe a request to access content that requires a higher Purchase Power value than the user has even after he changed Purchase Power value operation 436. From decision 426, flow 400 may then proceed as previously described above.

As can be appreciated by the description of FIG. 4, flow 400 provides a number of advantages to both content providers and users accessing content. For example, a relationship is established whereby a user, who may not trust a content provider initially, can access content without risk that the user has to pay for content that it will later find is not useful. If this occurs, the embodiment described with respect to FIG. 4 allows a user to simply pay zero for the accessed content. Also, in those embodiments in which the user provides minimal information, there is no risk that the content provider will maliciously use information about the user.

With respect to the content provider, the content provider does not have to merely give away content without any possibility of receiving a value for the content. As noted in the description of FIG. 4, if a user decides to make a payment of zero for accessed content, a content provider may establish sales rules that eventually will not allow the user to access any additional content. Thus, a user who finds the content from the content provider useful is encouraged to provide some value that is fair for the content accessed from the content provider or else they will no longer be allowed to access content. These are merely some advantages provided by the embodiments of the present invention described with respect to FIG. 4. These advantages are not intended to limit the scope of the present invention or the claimed subject matter and are merely being pointed out as features of some embodiments.

Figure 7:
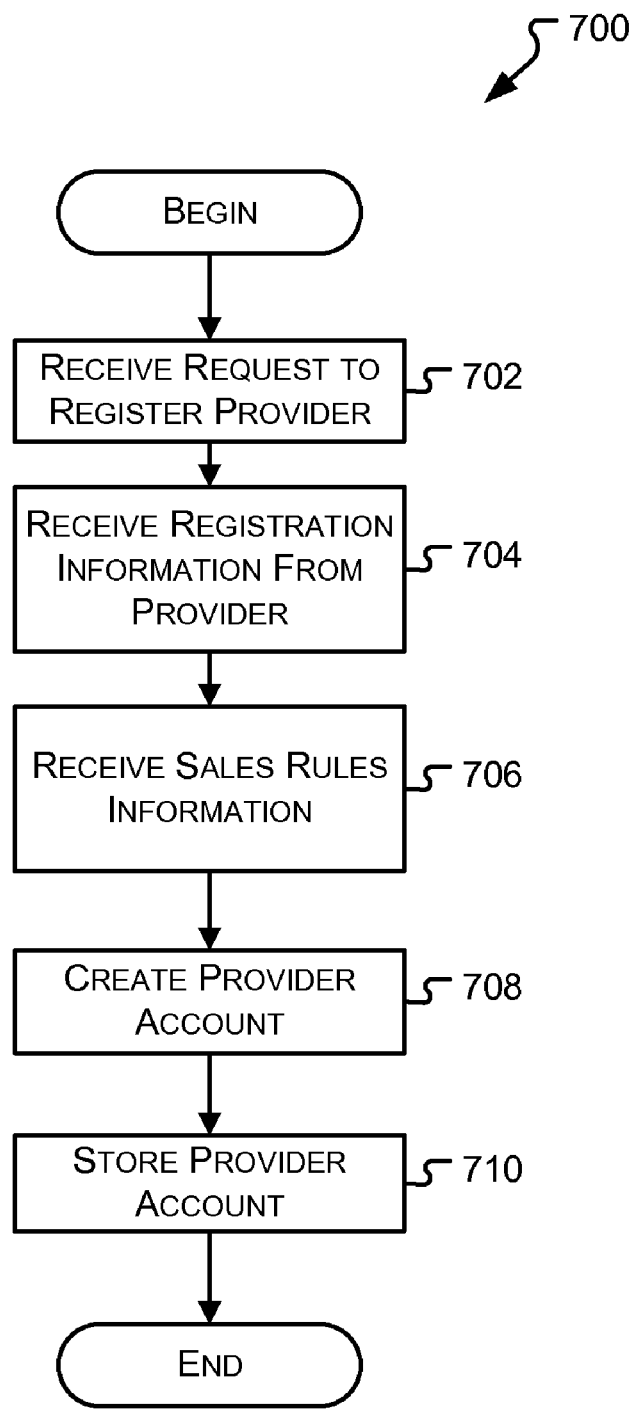
FIG. 7 illustrates a process of registering content providers according to an embodiment.

FIG. 7 illustrates an operational flow 700 according to an embodiment, for providing registering a content provider with a content evaluation system for managing the distribution of content of the content provider. In embodiments, flow 700 is performed by a content valuation system such as those described above 112 (FIG. 1) and 212 (FIG. 2). The content valuation system can be used to provide content from content providers to users. Flow 700 includes operation 702 where a request to register a content provider is received. Operation 702 may occur by for example a content provider clicking the website associated with a content evaluation system. The content evaluation system may then request registration information from the content provider. As such, flow 700 passes from operation 702 to operation 704 where registration information from the content provider is received. As those with skill in the art will appreciate, operation 704 may be performed, in embodiments, by providing a form into which a content provider enters information. Any other suitable way for receiving information from the provider may be used in performing operation 704. After operation 704, flow passes to operation 706 where sales rules are received from the content provider. As noted in detail above, sales rules may include a number of different parameters including parameter or conditions that limit when a user may access content, the amount of initial access value (or Purchase Power) provided to a user. In other embodiments, sales rules may include information indicating how a user's payment history for previously accessed content may affect the amount of access value provided to the user.

FIG. 8 illustrates a user interface screen that may be provided as part of implementing embodiments of the present invention. The user interface screen illustrated in FIG. 8, includes information that may be received during operations 704 and 706 of flow 700. As illustrated in FIG. 8 such information may include content name, content category, weight factors, suggested retail price, initial purchase power etc. As can be seen in the embodiment shown in FIG. 8, there is an element 802 that provides an option for a provider to select a charity for applying any money paid by users of the content. Element 804 provides a field for a provider to assign an initial purchase power to new users. Element 806 when selected allows a provider to add new products, e.g., content, to be provided using the valuation system. As those with skill in the art will appreciate, FIG. 8 is merely one example of a user interface screen that may be used. In other embodiment, elements 802, 804, and 806 may include, without limitation, one or more of drop down menus, buttons, fields, and text.

Referring again to FIG. 7, flow passes from operation 706 to operation 708 where an account is created for the content provider. The account may be associated with all of the information received from content provider during operations 704 and 706. At operation 710, the provider account is stored in one or more computer storage media.

In other embodiments, flow 700 may include additional operations not shown in FIG. 7. For example, after content providers registered, because provider may access information from the account created and stored in operations 708 and 710. The provider may then make modifications such as adding additional content that will be distributed using the content valuation system. The provider may change sales rules such as the amount of initial access value (i.e., Purchase Power) provided to a user.

Figure 9:
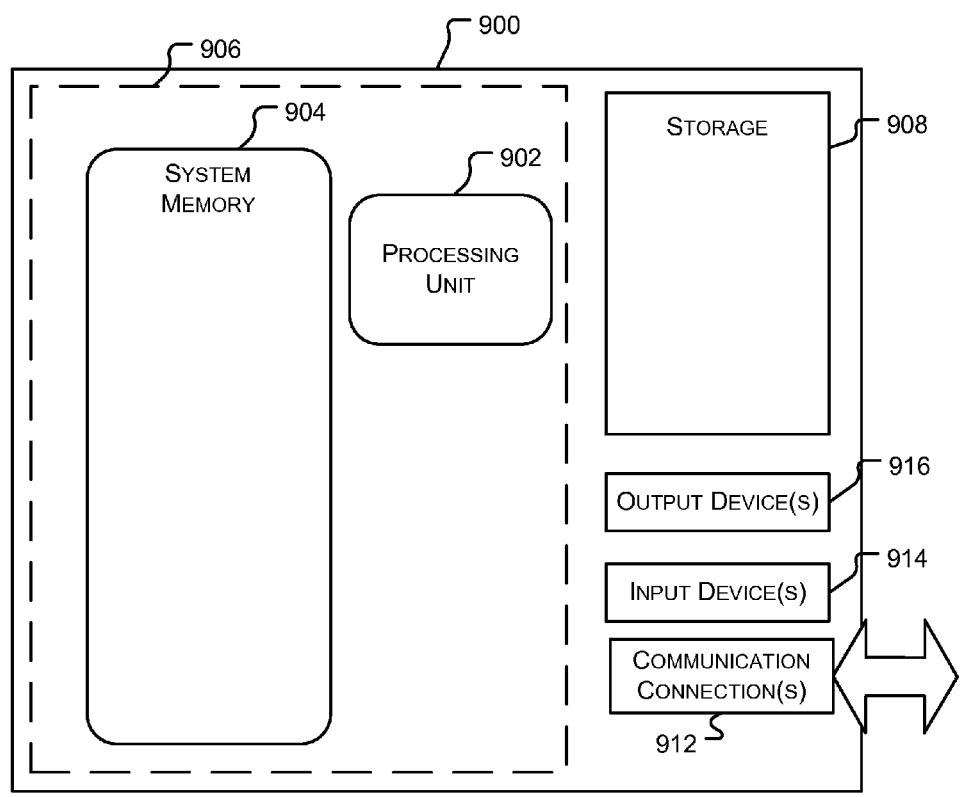
FIG. 9 illustrates a basic computing device for implementing embodiments of the present invention.

FIG. 9 illustrates a general computer environment illustrated as computing device 900, which can be used to implement the embodiments described herein. The computer environment 900 is only one example of a computing environment and is not intended to suggest any limitation as to the scope of use or functionality of the computer and network architectures. Neither should the computer environment 900 be interpreted as having any dependency or requirement relating to any one or combination of components illustrated in the example computer environment 900.

In its most basic configuration, environment 900 typically includes at least one processing unit 902 and memory 904. Depending on the exact configuration and type of computing device, memory 904 may be volatile (such as RAM), nonvolatile (such as ROM, flash memory, etc.) or some combination of the two. This most basic configuration is illustrated in FIG. 9 by dashed line 906.

Additionally, environment 900 may also have additional features/functionality. For example, environment 900 may also include additional storage 908 (removable and/or non-removable) including, but not limited to, magnetic or optical disks or tape. Such additional storage is illustrated in FIG. 9 by storage 908.

Computer storage media includes volatile and nonvolatile, removable and non-removable media implemented in any method or technology for storage of information such as computer readable instructions, data structures, program modules or other data. Memory 904 and storage 908 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices. Any such computer storage media may be part of environment 900.

System 900 may also contain communications connection(s) 912 that allow the system to communicate with other devices. Communications connection(s) 912 is an example of communication media.

Environment 900 may also have input device(s) 914 such as keyboard, mouse, pen, voice input device, touch input device, etc. Output device(s) 916 such as a display, speakers, printer, etc. may also be included. All these devices are well know in the art and need not be discussed at length here.

Reference has been made throughout this specification to "one embodiment" or "an embodiment," meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method comprising:
    assigning by a computer system a first initial purchasing power value to a user, wherein the first initial purchasing power value is assigned to the user based at least in part on a first sales rule established by a first content provider of a plurality of content providers, wherein the first initial purchasing power value is reduced to generate a first current purchasing power value after the user accesses content provided by the first content provider;
    assigning by the computer system a second initial purchasing power value to the user, wherein the second initial purchasing power value is based at least in part on a second sales rule established by a second content provider different from the first content provider, wherein the second initial purchasing power value is reduced to generate a second current purchasing power value after the user accesses content provided by the second content provider;
    receiving an access validation request to determine whether to allow a user access to first content provided by the first content provider;
    determining by the computer system whether the first current purchasing power value is greater than a predetermined threshold value necessary to access the first content;
    if the first current purchasing power value is determined to be greater than the predetermined threshold value necessary to access the first content, then approving the user to access the first content; and
    if the first current purchasing power value is determined to be less than the predetermined threshold value necessary to access the first content then determining whether the user has provided, prior to the access validation request, at least partial payment toward different content previously accessed from the first content provider, wherein if the user has provided the at least partial payment then increasing the first current purchasing power value, otherwise refraining from increasing the first current purchasing power value.

2. The method of claim 1, further comprising:
    after a first predetermined period, providing a first statement to the user, the first statement comprising a plurality of payment options that the user may select to pay for the first content, wherein the plurality of payment options comprises an option for paying zero for the first content.

3. The method of claim 1, further comprising:
    providing evaluation options to the user that the user may select to evaluate the first content.

4. The method of claim 3, further comprising:
    providing an option for the user to share an evaluation of the first content with a social network.

5. The method of claim 2, further comprising:
    receiving an indication of the payment option selected by the user.

6. The method of claim 5, further comprising:
    based on the payment option selected by the user, changing the first current purchase power value.

7. The method of claim 1, wherein the first content provider establishes a third sales rule comprising one or more of:
    a suggested price for the first content, and
    a weight coefficient.

8. The method of claim 7, wherein the weight coefficient determines an affect that a payment for content will have on a user's purchase power value.

9. The method of claim 8, wherein based on an indication of payment provided by the user and the weight coefficient, changing the first current purchase power value.

10. A tangible computer readable medium storing instructions that when executed by at least one processor perform a method comprising:
    assigning by a computer system a first initial purchasing power value to a user, wherein the first initial purchasing power value is assigned to the user based at least in part on a first sales rule established by a first content provider of a plurality of content providers, wherein the first initial purchasing power value is reduced to generate a first current purchasing power value after the user accesses content provided by the first content provider;
    assigning by the computer system a second initial purchasing power value to the user, wherein the second initial purchasing power value is based at least in part on a second sales rule established by a second content provider different from the first content provider, wherein the second initial purchasing power value is reduced to generate a second current purchasing power value after the user accesses content provided by the second content provider;
    receiving an access validation request to determine whether to allow a user access to first content provided by the first content provider;
    determining by the computer system whether the first current purchasing power value is greater than a predetermined threshold value necessary to access the first content;

if the first current purchasing power value is determined to be greater than the predetermined threshold value necessary to access the first content, then approving the user to access the first content; and if the first current purchasing power value is determined to be less than the predetermined threshold value necessary to access the first content then determining whether the user has provided, prior to the access validation request, at least partial payment toward different content previously accessed from the first content provider, wherein if the user has provided the at least partial payment then increasing the first current purchasing power value, otherwise refraining from increasing the first current purchasing power value.

11. The tangible computer readable medium of claim 10, wherein the method further comprises:

after a first predetermined period, providing a first statement to the user, the first statement comprising a plurality of payment options that the user may select to pay for the first content, wherein the plurality of payment options comprises an option for paying zero for the first content.

12. The tangible computer readable medium of claim 10, wherein the method further comprises:

providing evaluation options to the user that the user may select to evaluate the first content.

13. The tangible computer readable medium of claim 12, wherein the method further comprises:

providing an option for the user to share an evaluation of the first content with a social network.

14. The tangible computer readable medium of claim 11, wherein the method further comprises:

receiving an indication of the payment option selected by the user.

15. The tangible computer readable medium of claim 14, wherein the method further comprises:

based on the payment option selected by the user, changing the first current purchase power value.

16. The tangible computer readable medium of claim 10, wherein the first content provider establishes a third sales rule comprising one or more of:

a suggested price for the first content, and a weight coefficient.

17. The tangible computer readable medium of claim 16, wherein the weight coefficient determines an affect that a payment for content will have on a user's purchase power value.

18. The tangible computer readable medium of claim 17, wherein the method further comprises:

based on an indication of payment provided by the user and the weight coefficient, changing the first current purchase power value.

19. A computer system comprising:

one or more processors;

one or more tangible computer readable media storing instructions that when executed by the one or more processors cause the one or more processors to perform a method comprising:

assigning by a computer system a first initial purchasing power value to a user, wherein the first initial purchasing power value is assigned to the user based at least in part on a first sales rule established by a first content provider of a plurality of content providers, wherein the first initial purchasing power value is reduced to generate a first current purchasing power value after the user accesses content provided by the first content provider;

assigning by the computer system a second initial purchasing power value to the user, wherein the second initial purchasing power value is based at least in part on a second sales rule established by a second content provider different from the first content provider, wherein the second initial purchasing power value is reduced to generate a second current purchasing power value after the user accesses content provided by the second content provider;

receiving an access validation request to determine whether to allow a user access to first content provided by the first content provider;

determining by the computer system whether the first current purchasing power value is greater than a predetermined threshold value necessary to access the first content;

if the first current purchasing power value is determined to be greater than the predetermined threshold value necessary to access the first content, then approving the user to access the first content; and if the first current purchasing power value is determined to be less than the predetermined threshold value necessary to access the first content then determining whether the user has provided, prior to the access validation request, at least partial payment toward different content previously accessed from the first content provider, wherein if the user has provided the at least partial payment then increasing the first current purchasing power value, otherwise refraining from increasing the first current purchasing power value.

20. The computer system of claim 19, wherein the instructions further comprise: after a first predetermined period, providing a first statement to the user, the first statement comprising a plurality of payment options that the user may select to pay for the first content, wherein the plurality of payment options comprises an option for paying zero for the first content.

* * * * *